US012776908B2

(12) United States Patent
Simon et al.

(10) Patent No.: US 12,776,908 B2
(45) Date of Patent: Oct. 27, 2026

(54) RANDOMIZED CONTENT ACCESS IN TOKEN-BASED DELIVERY PLATFORMS

(71) Applicant: Synamedia Limited, Staines Upon Thames (GB)

(72) Inventors: Gwendal Brieuc Christian Simon, Rennes (FR); Gwenaël Jacques Doërr, Rennes (FR)

(73) Assignee: Synamedia Limited, Maidenhead (GB)

( * ) Notice: Subject to any disclaimer, the term of this patent is extended or adjusted under 35 U.S.C. 154(b) by 183 days.

(21) Appl. No.: 18/531,646

(22) Filed: Dec. 6, 2023

(65) Prior Publication Data

US 2025/0193008 A1 Jun. 12, 2025

(51) Int. Cl.
*H04L 29/06* (2006.01)
*H04L 9/32* (2006.01)
*H04L 9/40* (2022.01)

(52) U.S. Cl.
CPC .......... *H04L 9/3213* (2013.01); *H04L 63/107* (2013.01)

(58) Field of Classification Search
CPC ............................ H04L 9/3213; H04L 63/107
USPC .......................................................... 713/168
See application file for complete search history.

(56) References Cited

U.S. PATENT DOCUMENTS 7,231,445 B1 * 6/2007 Aweya ................ H04L 67/1001 709/227
8,630,409 B2 * 1/2014 Woodruff ................ H04L 9/008 713/168
9,418,214 B1 * 8/2016 Harding .............. G06F 21/6254
10,310,923 B1 * 6/2019 DeRosa .............. G06F 11/0727
2010/0153719 A1 * 6/2010 Duc ...................... H04L 9/3271 713/168
2019/0044950 A1 * 2/2019 Chen ....................... H04L 67/02
2019/0273748 A1 9/2019 Roth et al.
2022/0110082 A1 * 4/2022 Belling ................. H04W 8/005
2024/0267373 A1 * 8/2024 Statia .................... G06F 21/335

FOREIGN PATENT DOCUMENTS

EP 3257221 B1 3/2022

OTHER PUBLICATIONS

Zhang, "Distributed privacy-preserving access control in sensor networks", 2011, IEEE, pp. 1-12 (Year: 2011).*
Xiao, "Security and Privacy in Cloud Computing", 2013, IEEE, vol. 15, pp. 843-856 (Year: 2013).*
Extended European Search Report for corresponding EP Appl. No. 24212243.0 dated Apr. 4, 2025 (7 pages).

* cited by examiner

*Primary Examiner* — Taghi T Arani
*Assistant Examiner* — Gregory A Lane
(74) *Attorney, Agent, or Firm* — Fernando & Partners, LLP

(57) ABSTRACT

Techniques for randomized content access control in token-based delivery platforms are described herein. In various embodiments, one or more servers hosting a content delivery network receive a request for content from a client device, where the request includes an access token granted to a client associated with the client device. The server(s) obtain a probability of rejection and a randomized probability upon validating the access token and determine whether to reject the request based on comparing the access token and rejected tokens and comparing the probability of rejection and the randomized probability. The server(s) also record the access token to the rejected tokens upon determining to reject the request.

19 Claims, 6 Drawing Sheets

RANDOMIZED CONTENT ACCESS IN TOKEN-BASED DELIVERY PLATFORMS

TECHNICAL FIELD

The present disclosure relates generally to anti-piracy and, more specifically, to content protection in token-based delivery platforms.

BACKGROUND

A form of piracy, known as content delivery network (CDN) leeching, has become a prominent problem for video service providers relying on over-the-top (OTT) content delivery. Pirates engaging CDN leeching typically share tokens that provide access to content within the service provider's delivery infrastructure. With these tokens, users of the pirate service can directly fetch data from a CDN. This not only allows illegal users to access content without subscribing but also results in legitimate OTT service providers unwittingly covering the delivery costs for pirates. Furthermore, the quality of the "pirate stream" matches that of the legitimate service, thus exacerbating the problem by increasing churn from the legitimate services. Despite the implementation of authentication tokens and Digital Rights Management (DRM), OTT video streaming services have struggled to curb the rise of CDN leeching.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
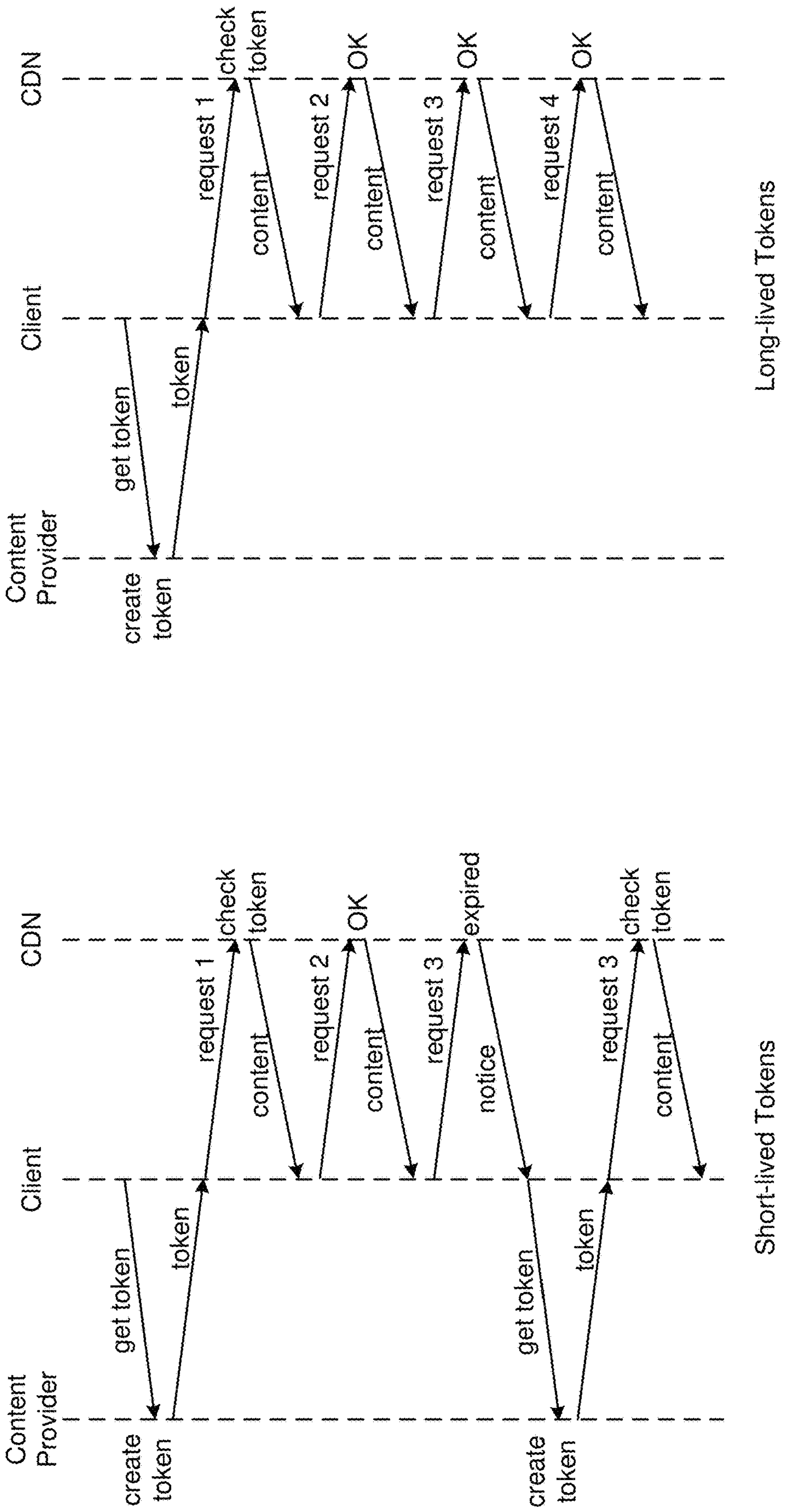
FIG. 1 is a diagram illustrating exemplary access granting and validation of tokens in token-based content delivery platforms.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

To address content delivery network (CDN) leeching, methods, devices, and systems described herein introduce a degree of randomness to the behavior of server(s) (e.g., server(s) hosting CDN(s)) in token-based delivery platforms. Token-based delivery platforms use tokens to facilitate content access and tokens are often reused for multiple consecutive requests. In some embodiments, even if a token is valid, the server(s) choose to reject a request with a certain probability, referred to hereinafter as the probability of rejection (PoR). In some embodiments, the server(s) obtain a random number within the [0,1] range from a uniform distribution and compare it to the PoR to determine whether to randomly reject a request with a valid token. In some embodiments, when a valid token is rejected due to the described randomized token rejection process, the server(s) insert it into a list of recently randomly rejected tokens. Any future requests using a token from this list will be rejected.

In accordance with various embodiments, a randomized content access control method is performed at one or more servers that include one or more processors and non-transitory memory, e.g., server(s) hosting a CDN. The server(s) receive a request for content from a client device, wherein the request includes an access token granted to a client associated with the client device. The server(s) then obtain a probability of rejection and a randomized probability upon validating the access token and determine whether to reject the request based on comparing the access token and rejected tokens and comparing the probability of rejection and the randomized probability. The server(s) also record the access token to the rejected tokens upon determining to reject the request.

EXAMPLE EMBODIMENTS

As described above, many token-based content delivery platforms (also referred to hereinafter as "token-based delivery platforms") use tokens to facilitate content access and the tokens are reused for multiple consecutive content requests. A token (also referred to hereinafter as "an authorization token", "a content delivery network (CDN) token", or "an access token") is a small digital object that encodes the requirements for granting access to a resource. It is often attached to content requests from the client to the CDN server to give access to resources.

Token-based delivery platforms typically involve multiple entities, e.g., the content provider (and/or the video service provider), the client, and the CDN server, etc. The client triggers the generation of a new token by sending some data related to its next request(s) to the content provider. The content provider validates the request(s) and issues an encrypted and integrity-protected token, typically relying on some cryptographic primitives. The client then sends the token alongside its request(s) to the CDN server, which (i) decrypts the token, (ii) validates the integrity of the token, (iii) checks whether the requirements of the token are met, and (iv) grants access if all checks pass. In some embodiments, crypto-secrets necessary for performing these tasks are exchanged among the multiple entities and managed at the configuration level. Tokens thus provide a light-weight optional security layer without compromising the streaming scalability, which is the baseline purpose of CDN servers.

Existing access tokens typically have fixed expiration times. More generally, the community distinguishes short-lived tokens, which either have a short expiration time or refer to a small number of consecutive assets, and long-lived tokens, which either have a long expiration time or refer to a long series of consecutive assets. There is an intrinsic trade-off between the token expiration delay set by the token issuer (typically the content provider and/or the video service provider) and the computational burden incurred onto the token verifier (typically a CDN) to verify the token, as illustrated in FIG. 1.

FIG. 1 is a diagram 100 illustrating the access granting and validation of short-lived tokens and long-lived tokens. On the left, a short-lived token requires frequent computational processing for validation by the CDN, such as performing frequent crypto-operations token for retrieving the semantics of a token. Further, the token issuer, such as the content provider, has to generate tokens more often to accommodate users who wish to refresh their tokens to continue their viewing sessions. Consequently, although short-lived tokens are more effective in preventing piracy, the computational cost is high. On the right, a long-lived token requires fewer computational resources. With long-lived tokens, the token verifier can cache the semantics of the token, thereby skipping cryptographic operations the next time a CDN server has to verify the same token. However, long-lived tokens are more likely to be shared by pirates, thus they are less effective in preventing piracy.

Due to current infrastructure constraints, the long-lived tokens have been the prevailing implementation in the industry to date, and the expiration period of a long-lived token is often set to last the duration of a viewing session, e.g., up to 24 hours. Unfortunately, such designs lower the bar for piracy, as pirate providers only have to share their legally acquired token to grant access to a potentially large population of pirate users. From a security perspective, it is therefore desirable to reduce the token time-to-live (TTL) to make piracy more difficult. Indeed, due to the short expiration time of shared tokens, pirates have to republish tokens on a regular basis to maintain the quality of their service.

Some in the industry attempt to standardize a way to refresh a token, such as using a temporary HTTP redirect to return to the control plane (e.g., serves owned by the service provider and/or the content provider) or providing the CDN with some crypto secrets required to renew a token. This grants the ability to CDNs to check access rights for a subset of requests within a viewing session, e.g., checking media segment requests. While an in-progress specification developed by such efforts regulates how to enforce an access token, it is left to the CDN configuration to detail which requests will have their access token enforced. As such, while efforts aim to streamline a token update mechanism that is inherently required as soon as one considers reducing the TTL of a token, previously existing access token authorization and renewing mechanisms are static configurations aimed at striking a trade-off between computational cost and token life duration. Inherently, such static configurations have undesirable side effects, such as peak transactions per second (TPS), when token generation becomes periodical (based on the time to live of the token) rather than ephemeral. For instance, when a football match starts at 8 pm, many viewers tune it around the same time, creating a peak TPS for the initial token requests. If nothing else is done, assuming that the service issues access tokens with a 15-minute TTL, the majority of viewers return at about the same time to renew their expired tokens, thus creating a periodical peak TPS for the token generation service.

Regardless of using short-lived or long-lived tokens, as shown in FIG. 1, currently over-the-top (OTT) video delivery platforms implicitly assume a deterministic behavior. For instance, given a token, the CDN server either validates or rejects a request, depending on whether the access conditions specified in the token are met or not. In contrast, the dynamic content access method described herein randomizes the behavior of the CDN server. Even if a token is valid, the CDN server randomly rejects requests according to a probability of rejection (PoR). The randomization makes piracy significantly more challenging, thus addressing the previously mentioned issue of CDN leeching. When an access token is shared among a large number of pirate users, the probability of the token being rejected increases rapidly. On the other hand, legitimate users are only marginally affected because their tokens, used by a single person, have a low probability of rejection.

For example, assuming a PoR is set to 1 for 10,000, e.g., PoR=1/10000, and very long-lived tokens are used for content access. On average, a user emits one request every 2 second, thus emitting 15*(60/2)=450 requests with the same token. A legitimate user thus only has 4.4% chance to have her token randomly rejected within 15 minutes.

$$\begin{aligned} P(\text{rejection in 15 minutes}) &= 1 - P(\text{no rejection in 15 minutes}) \\ &= 1 - P(\text{request not rejected})^\wedge 450 \\ &= 1 - (1 - PoR)^\wedge 450 \\ &\approx 0.044 \end{aligned}$$

In comparison, when a group of 5,000 pirate viewers collectively emits 5000*(60/2)=150000 requests in 1 minute with the same token, the group would face 99.9999% chance of having their shared token randomly rejected within a single minute.

$$\begin{aligned} P(\text{rejection in 1 minute}) &= 1 - (1 - PoR)^\wedge 150000 \\ &\approx 0.999999694 \end{aligned}$$

Figure 2:
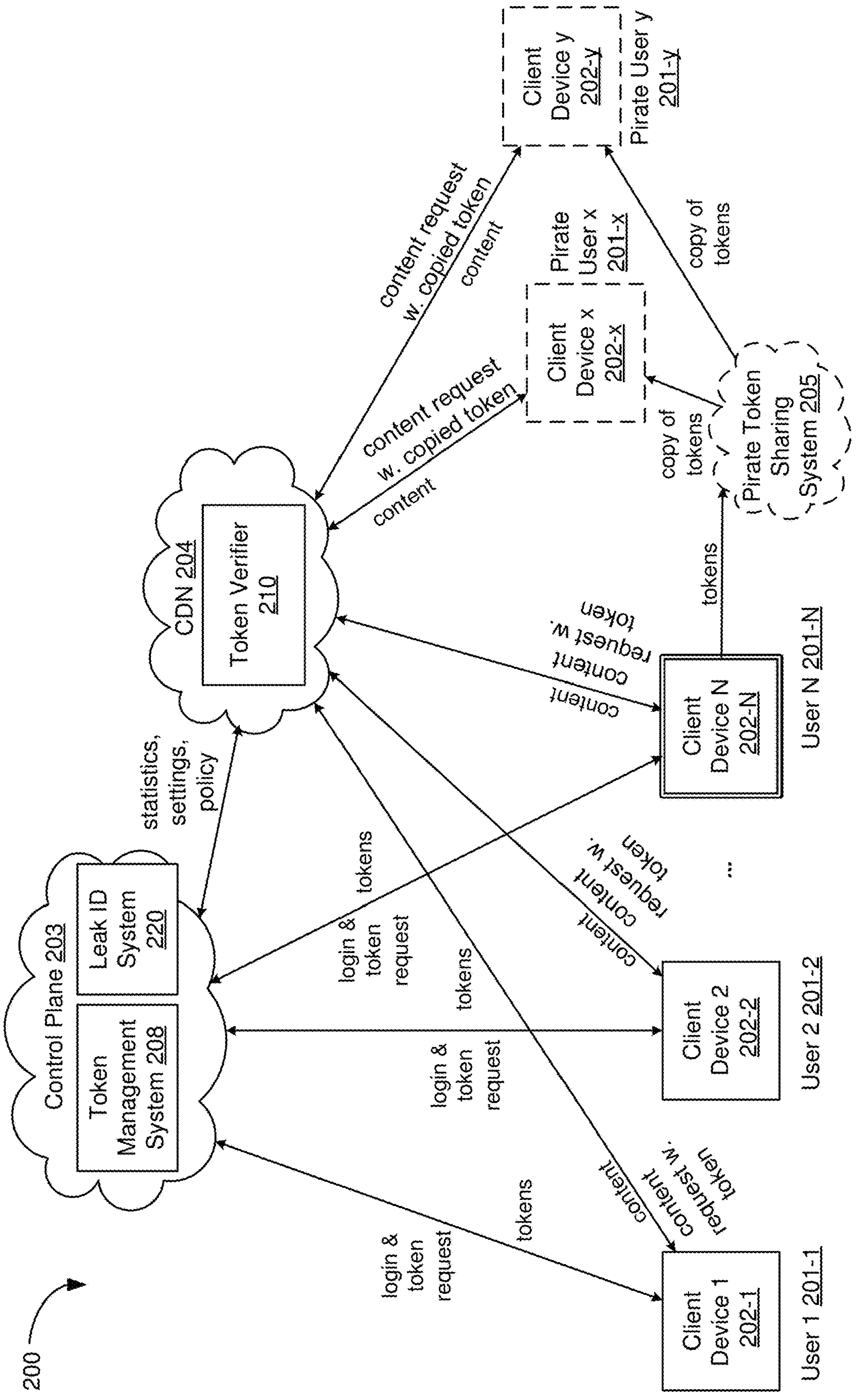
FIG. 2 is a block diagram illustrating an exemplary token-based content delivery platform with randomized content access, in accordance with some embodiments.

FIG. 2 illustrates an exemplary token-based delivery platform 200 with randomized content access in accordance with some embodiments. The exemplary token-based delivery platform 200 includes a control plane 203 for authentication and/or authorization and a CDN 204 for providing resources, such as media content and/or services, to a plurality of users 201 (e.g., user 1 201-1, user 2 201-2, . . . , user N 201-N, etc.) at a plurality of client devices 202 (e.g., client device 1 202-1, client device 2 202-2, . . . , client device N 202-N, etc.). As used hereinafter, a client refers to a user 201 and/or a client device 202.

In some embodiments, the control plane 203 is hosted on one or more servers operated by a content provider and/or a service provider. Similarly, the CDN 204 is hosted on one or more servers with one or more processors and one or more non-transitory memory. In some embodiments, the control plane 202 includes a token management system 208 for checking client identities and privileges, sharing encryption keys with the CDN, and/or issuing tokens upon verifying the client identities and privileges. The CDN 204, on the other hand, includes a token verifier 210 to share encryption keys with the control plane 202, verify tokens, and/or caching token semantics.

As will be described in further detail below, in some embodiments, the token-based delivery platform 200 includes a communication path between the control plane 203 and the CDN 204. Through the communication path, statistics (e.g., CDN capacities), settings (e.g., PoR configured for the CDN 204), and/or policies (e.g., whether to allow adjustments to the PoR) are exchanged between the control plane 203 and the CDN 204 for configuring and updating the PoR at the server(s) hosting the CDN 204.

As explained above, many token-based delivery platforms have separate sub-systems, and tokens are used to carry information from the authentication stage to the resource access stage. Over-the-top (OTT) streaming often operates on token-based delivery platforms, where user authentication is carried out by one sub-system, e.g., the control plane 203, and the resource service is performed in another sub-system, e.g., the CDN 204. In FIG. 2, the users 201 use the client devices 202 to login and request tokens from the token management system 208. In addition to login authentication and token generation, in some embodiments, the control plane 203 performs other tasks, such as piracy identification by a leak identification system 220, authorization, tracking, platform analysis, auditing, contract enforcement, and/or managing policies and settings. During the login phase, the token management system 208 authenticates the users 201 based on the information received from client device 202 in the request. Upon authenticating the users 201, the control plane 103 sends tokens for CDN access to the client devices 202. The client devices 202 can then use the tokens to request content and services from the CDN 204.

FIG. 2 also illustrates that a pirate token sharing system 205 may operate on the platform 200. The pirate token sharing system 205 acquires tokens, e.g., from a leak such as user N 201-N at client device N 202-N. The leak may be a user, who signed up and paid for resources, thus acquired licenses and/or tokens legitimately but illegally or unknowingly shared the valid tokens with the pirate token sharing system 205. Upon obtaining the tokens, the pirate token sharing system 205 creates copies of the tokens and distributes them to pirate users, such as pirate user x 201-*x* at client device x 202-*x* and pirate user y 201-*y* at client device y 202-*y*. Using these copies, pirate users x and y 201-*x* and 201-*y* request and attempt to obtain resources (e.g., media content and/or services) from the CDN 204.

To make piracy more challenging, in some embodiments, the CDN 204 includes a token verifier 210 that maintains PoR settings as well as a recently rejected token table and performs probabilistic rejection tests for rejecting tokens. As described above, when the token verifier 210 randomly rejects tokens based on the PoR settings, the probability of a reused token being rejected increases rapidly. In some embodiments, the leak identification system 220 facilitates the identification of the leak, e.g., user N 201-N at client device N 202-N. In some embodiments, the leak identification system 220 records the frequency of token updates. When the leak 201-N (also known as "a pirate provider") frequently requests updated tokens due to frequent rejections by the token verifier 210, in accordance with various embodiments, the leak identification system 220 isolates such users whose token renewal schedule significantly deviates from statistical expectations and takes actions to prevent piracy, e.g., no longer providing tokens to such users.

It should be noted that the token management system 208, the leak identification system 220, and the token verifier 210 can include appropriate hardware, software, firmware, and/or virtual machines to perform the operations attributed to the element herein. In some embodiments, a plurality of servers supporting the token management system 208, the leak identification system 220, and the token verifier 210 can be on different devices, at different locations, or co-located on one or more devices but configured as different instances, e.g., as virtualized instances in a cloud platform running on top of the processor(s) of one or more servers. In particular, the token management system 208, the leak identification system 220, and the token verifier 210 can be distributed over the control plane 203 and the CDN 204. For example, subcomponents of the token management system 208 and the leak identification system 220 can be distributed over the servers hosting the control plane 203 and the CDN 204 so that the token rejections by the CDN 204 can be reported to the control plane 203 via the communication path to facilitate the leak identification. The control plane 203 can then aggregate the rejection information for leak identification. In another example, subcomponents of the token verifier 210 can be distributed so that via the communication path, statistics of the CDN 204 can be reported to the control plane 203 to facilitate token management. The control plane 204 can then configure the tokens based on the statistics when issuing and managing tokens to the client devices 202.

Figure 3:
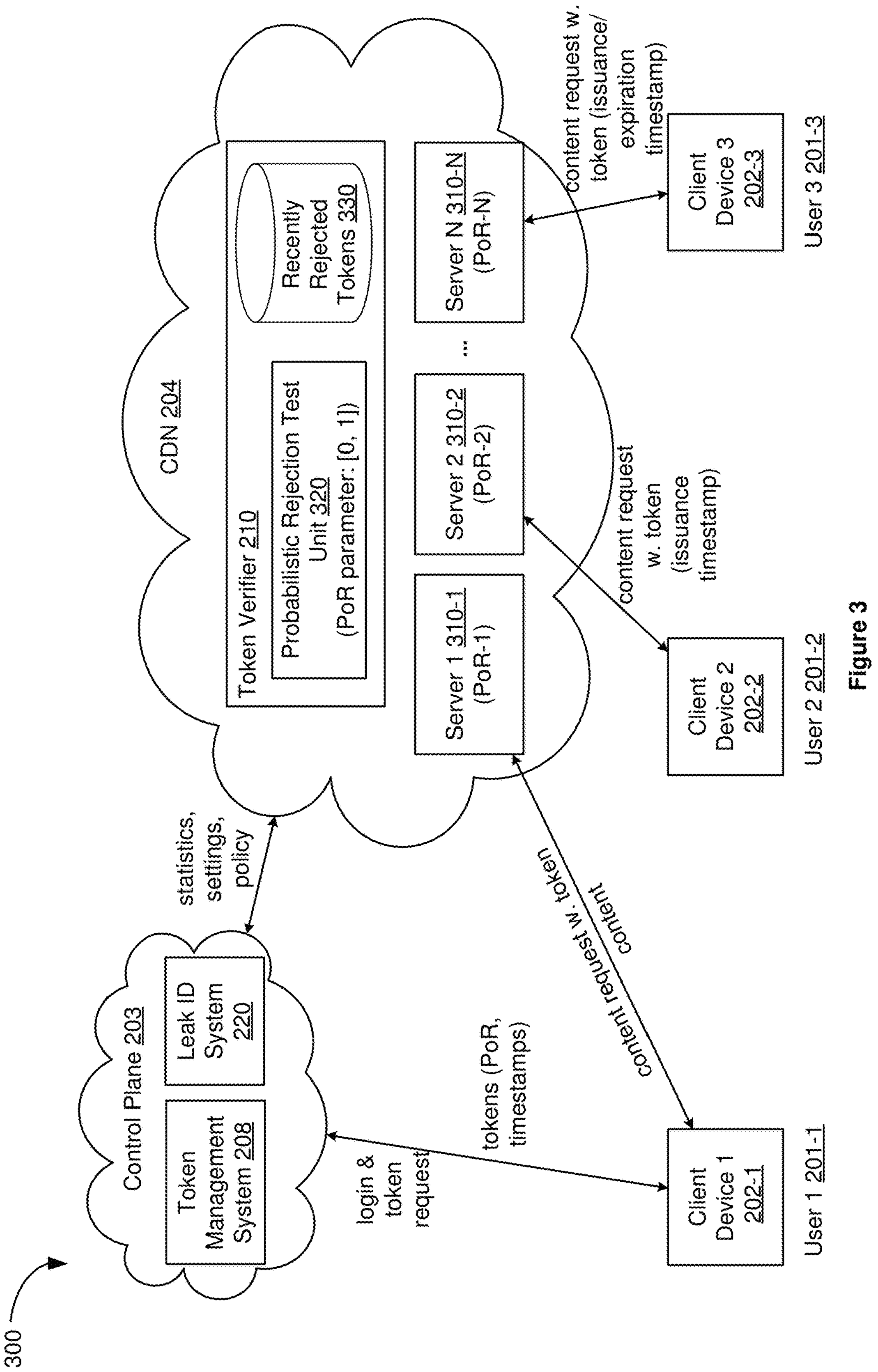
FIG. 3 is a block diagram illustrating probability of rejection configurations for randomized content access in the exemplary token-based content delivery platform, in accordance with some embodiments.

FIG. 3 is a diagram 300 illustrating PoR configurations for randomized content access in the exemplary token-based delivery platform 200 in accordance with some embodiments. In some embodiments, the token verifier 210 on the CDN 204 includes a probabilistic rejection test unit 320 and a repository for storing recently rejected tokens 330, e.g., stored in a table and/or a database. In some embodiments, the table or database stores the recently rejected tokens 330 for some amount of time, e.g., a predetermined limited duration, or for an infinite amount of time. In some embodiments, the probabilistic rejection test unit 320 includes a PoR parameter in the range of [0, 1], e.g., a randomized probability. When conducting probabilistic rejection tests, in some embodiments, the probabilistic rejection test unit 320 draws a random number from a uniform distribution within the range of [0,1] as the PoR parameter and compares a PoR with the PoR parameter and determines whether to reject a valid token based at least in part on the comparison result. Upon determining that the comparison satisfies a rejection criterion, e.g., when the PoR parameter value is less than the PoR or the satisfaction of applying some other functions to the PoR parameter and the PoR value, the probabilistic rejection test unit 320 rejects the token and adds the token to the recently rejected tokens 330 even if the token is valid. Additionally, in some embodiments, in addition to evaluating the PoR value, the probabilistic rejection test unit 320 compares a token with the stored recently rejected tokens 330. In the case of locating the token among the recently rejected tokens 330, namely, the token exists in the stored recently rejected tokens 330, the probabilistic rejection test unit 320 rejects the token, even if the token is valid.

In some embodiments, the PoR is set at the server level so that the token verifier 210 obtains the PoR value from the servers 310 (e.g., server 1 310-1, server 2 310-2, . . . , server N 310-N, etc.) when performing the probabilistic rejection test in response to receiving a content request with a token. For instance, the CDN 204 can be the main entity to statistically configures the PoR at the servers 310 associated with the CDN 204. In some embodiments, the PoR is a variable that the CDN 204 globally configures based at least in part on the number of received requests, the time of the day, and the type of streaming service, etc.

For example, when server 1 310-1 is busy serving clients, including user 1 201-1 at client device 1 202-1, the CDN 204 configures server 1 310-1 with a low PoR-1 value for load reduction. In another example, during prime-time evening hours, the CDN 204 configures server 2 310-2 with a high PoR-2 value. Based at least in part on the higher PoR-2 value, the probabilistic rejection test unit 320 is more likely to reject content requests from clients, such as user 2 201-2 at client device 2 202-2 during busy media consumption hours. In yet another example, having identifying the type of streaming service provided by server N 310-N, e.g., a popular channel streamed to clients including user 3 201-3 at client device 3 201-3, the CDN 204 configures a high PoR-3 value for higher protection against CDN leeching.

When the PoR is statically conveyed at the CDN configuration level, the PoR impacts various consuming devices equally. For instance, PoR-1 affects all client devices requesting content from server 1 310-1; PoR-2 affects all client devices requesting content from server 2 310-2; and PoR-3 affects all client devices requesting content from server 3 310-3, etc. When associated with short-lived tokens, the randomized token rejection smoothens the token renewal requests schedule, as it compels users to renew their tokens more evenly over time, thereby alleviating the aforementioned peak TPS issue associated with short-lived tokens.

In some embodiments, instead of or in addition to having the CDN 204 configure the PoR at the server level, the PoR is conveyed from the control plane 203 and updated dynamically over time. In some embodiments, in one direction, the CDN 204 sends statistics of the CDN 204, e.g., the number of content requests, the type of content requested, identifiers of content requesters frequently being rejected, CDN processing capacity, network bandwidth, etc. Based on such statistics and/or policies, the control plane 203 sets and updates the PoR for the servers 310 of the CDN 204. In some embodiments, in one direction, the control plane 203 sends the PoR to the CDN 204 as part of the settings and/or policies over the communication path between the control plane 203 and the CDN 204. By having the bidirectional communication path, in the case of the CDN 204 not having sufficient computational resources for token processing and PoR value extraction, configuring a nominal PoR or a baseline PoR for the server(s) 310 by the control plane 203 reduces the overhead for the CDN 204.

For example, the control plane 203 can update PoR value(s) for the server(s) 310 based on the schedule of the linear service when a service provider wants to relax the CDN access verification overnight with a low PoR and enforce stricter access verification on weekends during prime time with a high PoR. In another example, the control plane 203 can update PoR value(s) for the server(s) 310 based on the number of TPS to limit the variation of token renewal requests, e.g., lowering the PoR in response to increasing TPS. By setting and/or updating the PoR, the number of token requests that the control plane 203 receives stays stable, thus preventing TPS peaks for token generation services. In yet another example, based on the service popularity of the services provided by the CDN, the control plane 203 increases the PoR so that more popular TV shows are protected with stricter access verification.

In some embodiments, instead of or in addition to configuring the PoR at the CDN server level by the CDN 204 and/or the control plane 203, the PoR is conveyed within the access token itself. In some embodiments, the server(s) 310 extract the PoR from the access token upon receiving the content request. This allows the token issuer(s) (e.g., the content provider and/or the server provider at the control plane 203) to enforce different PoRs for different groups of users and adjust the behavior of the content access at the CDN 204 on a more granular basis. For example, upon obtaining intelligence reports indicating that certain geographic region(s) and/or user(s) are more prone to piracy, the control plane 203 can assign tokens with a higher PoR in response to token requests from such region(s) and/or user (s) to enforce stricter access control. In another example, the token issuer can adjust the PoR according to the business value of shows, so that a high PoR value protects high-valued shows (e.g., sport events), and a low PoR value protects less valuable content.

To control the PoR setting in the tokens, in some embodiments, the token issuer(s) configure one or more properties of a token. When the token is used for requesting content, the CDN 204 extracts the one or more properties from the token and derives the PoR for the probabilistic rejection test. In some embodiments, the one or more properties include, but are not limited to, a nominal PoR value, a geographic location associated with the token requester, a network address associated with the token requester, an issuance timestamp, and/or an expiration timestamp, etc.

For example, the token can include an indication of the geographic location of the token requester, e.g., determined from the IP address associated with the token request. Upon receiving the content request along with the token, the CDN 204 can estimate the geographic location of the content requester based on the IP address associated with the content request. The CDN 204 can then derive the PoR based on policies that set the PoR value proportional to the distance between the geographic area of the token and the geographic location of the content requester. The further the distance, the more likely the token has been shared by the pirate token sharing system 205 (FIG. 2). Consequently, the CDN 204 sets a high PoR value to enforce stricter access control. Similarly, even without comparing the geographic locations from the content request and the token, in the event that the CDN 204 determines that the geographic location information from the token indicates that the token originated from restricted areas, the CDN 204 can set a high PoR value to increase the likelihood of rejecting content requests using the token.

In some embodiments, the probabilistic rejection test unit 320 obtains a nominal PoR value, e.g., from a token attached to a content request and/or from the server 310 serving the content request, and adjusts the PoR value according to policies and/or properties of the token. For example, the control plane 203 can communicate to the CDN 204 a policy for avoiding frequent rejections of content requests with newly issued tokens. In particular, the policy enables the CDN 204 to set the PoR value to zero when the current timestamp at the time of receiving the content request is within a threshold from the issuance timestamp of the token attached to the content request. Otherwise, the nominal PoR, whether extracted from the token or by server configuration, is used by the probabilistic rejection test unit 320 for content access control. In yet another example, when the token includes both issuance and expiration timestamps, the CDN 204 can adjust the PoR by increasing it from 0 to 1 between these two timestamps, e.g., PoR=(time_now−issuance_time)/(expiration_time−issuance_time), PoR=1/(expiration_time−time_now), or PoR=PoR_nominal/(expiration_time−time_now), etc.

It should be noted that the exemplary control plane 203 and the exemplary CDN 204 can include more, less, and/or different elements than shown in FIG. 3. Further, each of the elements shown in FIG. 3 can include appropriate hardware, software, firmware, and/or virtual machines to perform the operations attributed to the element herein. Operation(s) attributed to an element should not be considered binding and in some embodiments, other element(s) may additionally or alternatively perform such operation(s). For example, though the repository for storing the recently rejected tokens 330 is shown as part of the token verifier 210, the recently rejected tokens 330 can be stored on a separate device and/or node on the server and/or the cloud. In another example, though the token verifier 210 is shown as a single instance and as part of the CDN 204 and the probabilistic rejection test unit 320 is shown as part of the token verifier 210, sub parts or multiple instances of the token verifier 210 and the probabilistic rejection test unit can be distributed to one or more of the multiple servers 310 for randomized content access control.

Figure 4:
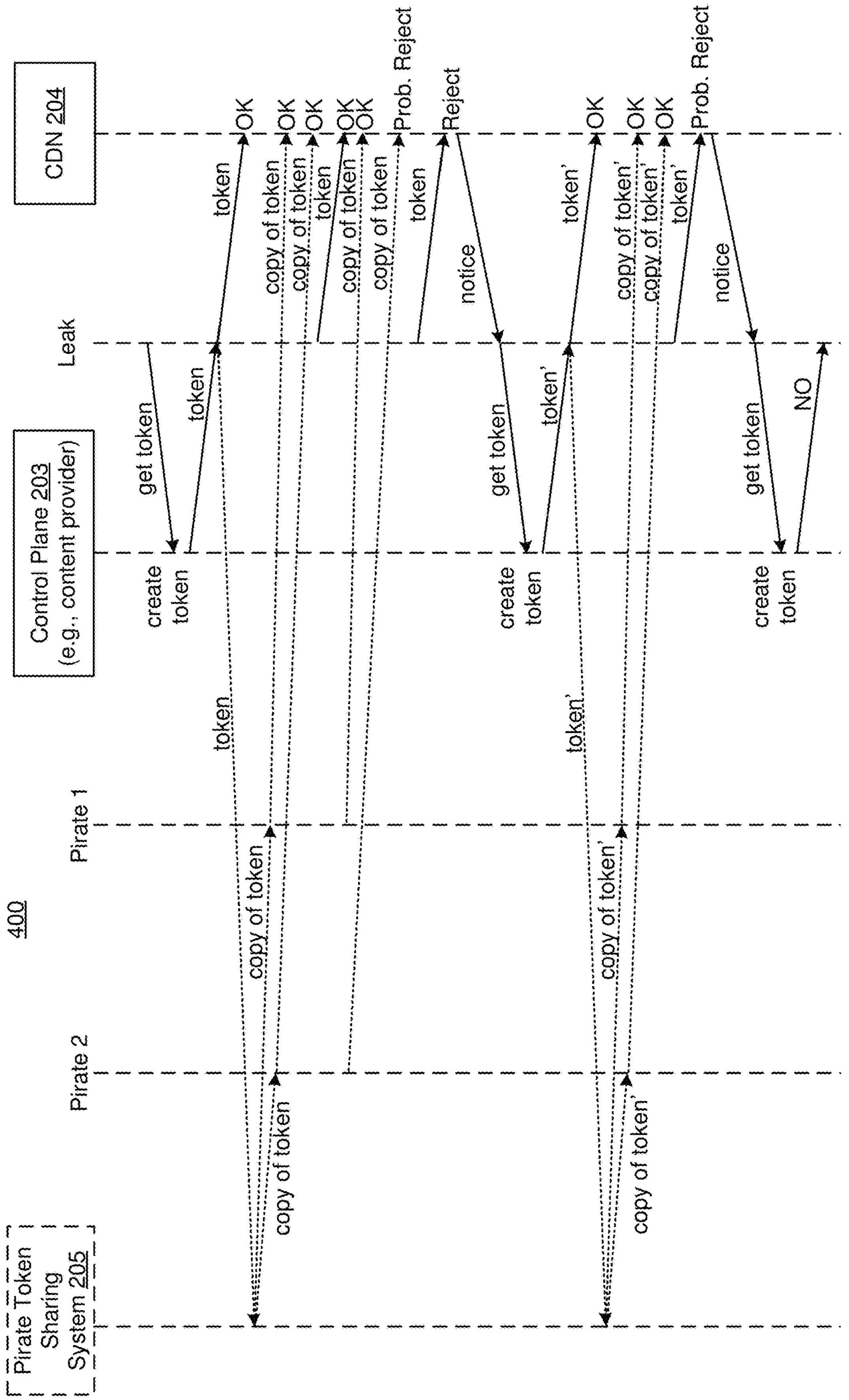
FIG. 4 is a diagram illustrating probabilistic rejection and leak identification in the exemplary token-based delivery platform, in accordance with some embodiments.

FIG. 4 is a diagram 400 illustrating probabilistic rejection and leak identification in the exemplary token-based delivery platforms 200 and 300 (FIGS. 2 and 3) in accordance with some embodiments. For the sake of diagram clarity, certain server responses such as returning content to the client device, etc., are not indicated. As shown in FIG. 4, the leak (e.g., user N 201-N in FIG. 2 who paid for subscription) obtains a valid token from the control plane 203 (e.g., a server operated by the content provider) by sending a get token request and receiving the token after the control plane 203 authenticates the token request. The leak then shares this valid token on the pirate token sharing system 205, which makes copies of the token and shares them with pirate 1 and pirate 2 (e.g., pirate user x 201-*x* and pirate user y 201-*y*, FIG. 2).

In this example, without loss of generality, the probabilistic rejection test at the CDN 204 fails at some point for a request from pirate 2 even though the token is still valid at that point. As described above with reference to FIG. 3, when the probabilistic rejection test unit 320 rejects the token, the rejected token is added to the recently rejected tokens 330, and any subsequent requests using the token are rejected as well, including the next content request from the leak. Once notified of the rejection, in some embodiments, the leak contacts the control plane 203 to get a new token, e.g., token', so that the playback session can be continued using the new token. Though not shown in FIG. 4, in some embodiments, pending that certain crypto-secrets have been shared at the server configuration level, the CDN 204 generates a new token on its own and instructs the client to use the newly issued token. Also not shown in FIG. 4, in some embodiments, instead of issuing a new token on its own, the CDN 204 communicates with the control plane 203 to recommend pushing a new token to the client.

Continuing the process in FIG. 4, once the leak shares token' with the pirate token sharing system 205, the pirate token sharing system 205 again makes copies of token' and shares copies of token' with pirate 1 and pirate 2. In the subsequent content requests using token', the probabilistic rejection test unit 320 (FIG. 3) on the CDN 204 eventually rejects token' from the leak and adds it to the recently rejected tokens 330 (FIG. 3). In some embodiments, when the leak contacts the control plane 203 again for a new or renewed token, the token request triggers the leak identification system 220 (FIGS. 2 and 3) to take action. In other words, rejecting the request at some point causes a frequency of the client requesting an updated access token to be evaluated. For instance, the leak identification system 220 (FIGS. 2 and 3) observes that this user asks for new tokens too often, e.g., a frequency of the client requesting an updated access token deviating from an expected frequency. The control plane 203 then marks the client as a possible leak and denies further requests for a new token from the leak.

Though FIG. 4 illustrates the control plane 203 (e.g., the content provider) tracking and conducting leak identification, in some embodiments, the deviation from expected behavior is detected on the CDN side. The CDN 204 can act independently or coordinate with the control plane 203 as a remote source for leak identification. For instance, the CDN 204 can detect the frequent rejection from a particular client (or for a type of content) and report the identifier of the client (or the type of content) to the control plane 203 as part of the statistics. Based on the reported statistics, the control plane 203 updates the PoR settings for the CDN 204 and records the potential leak. In another example, the control plane 203 can aggregate the records from multiple CDNs (e.g., aggregating reports of requests and/or tokens being rejected from multiple CDN nodes and/or servers), apply clustering to identify piracy behaviors statistically different from normal usage (e.g., deviating from the normal pattern), and update or adjust the PoR settings for various CDN nodes and/or servers accordingly. The token-based delivery platform described herein thus uses the PoR to randomize CDN behaviors and enforces a revocation mechanism for users whose behaviors statistically deviate from expectations. The randomized content access yields positive effects with respect to both CDN leeching anti-piracy and preventing TPS peaks for token generation services. Moreover, the extra-effort at the CDN is marginal (e.g., performing a random test), thus efficiently protecting resources against piracy.

Figure 5:
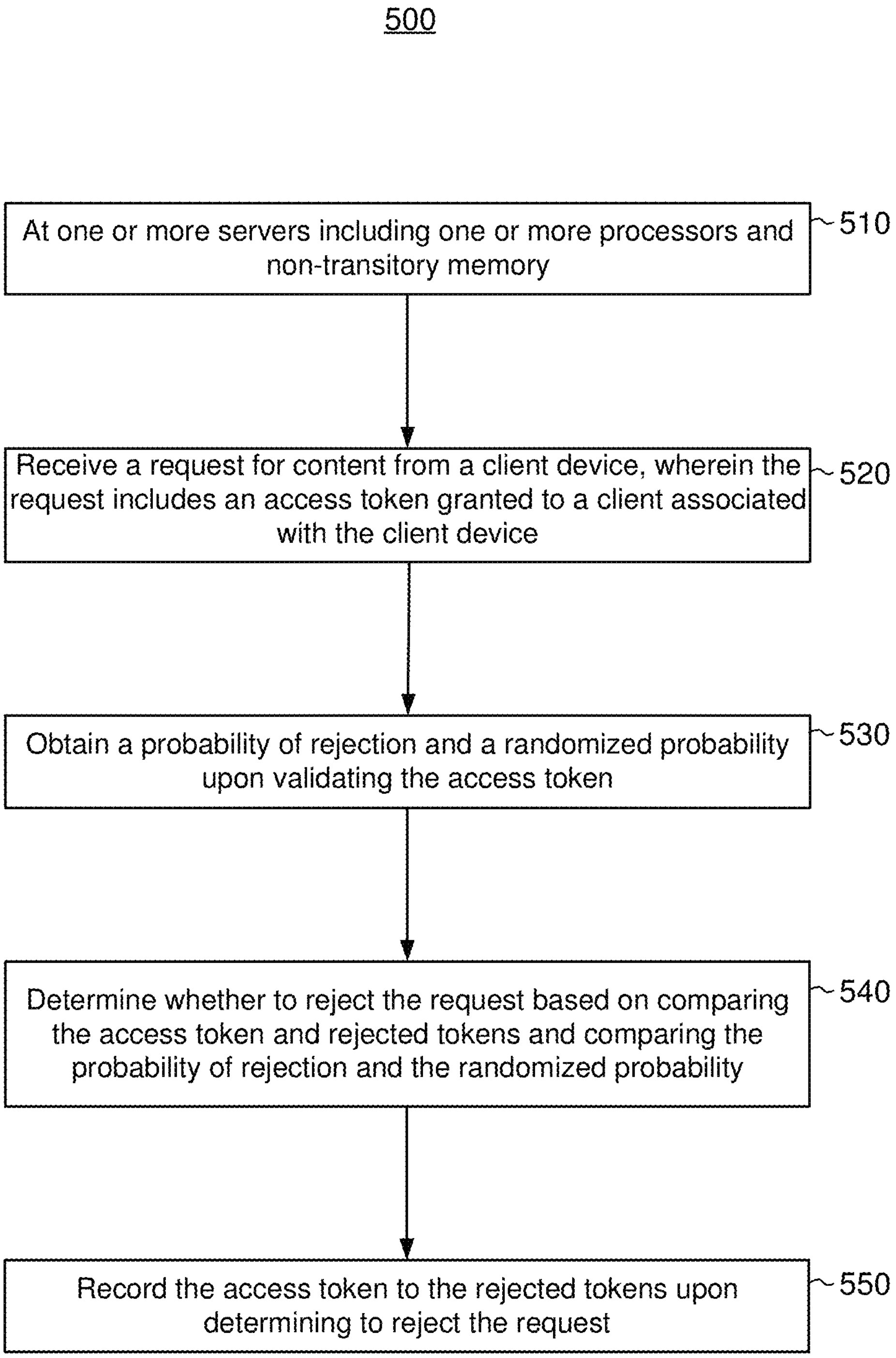
FIG. 5 is a flowchart illustrating a method for randomized content access in token-based delivery platforms, in accordance with some embodiments.

FIG. 5 is a flowchart illustrating a method 500 for randomized content access in token-based delivery platforms in accordance with some embodiments. In some embodiments, as represented by block 510, the method 500 is performed at one or more servers that include one or more processors and non-transitory memory, e.g., server(s) hosting the CDN 204 (FIGS. 2-4). As represented by block 520, the method 500 includes receiving a request for content from a client device, wherein the request includes an access token granted to a client associated with the client device, e.g., the CDN 204 receiving the content requests with tokens from client devices 202 as shown in FIGS. 2-4. As represented by block 530, the method 500 includes obtaining a probability of rejection and a randomized probability upon validating the access token, e.g., a valid token. As represented by block 540, the method 500 further includes determining whether to reject the request based on comparing the access token and rejected tokens and comparing the probability of rejection and the randomized probability. For instance, as shown in FIGS. 2-4, the token verifier 210 on the CDN 204 (in particular, the probabilistic rejection test unit 320) determines whether to reject a content request based on: (a) whether the token exists in the repository storing the recently rejected tokens 330; and (b) whether the PoR parameter, which is a random number in the range of [0, 1] from a uniform distribution, is less than the probability of rejection, which is set at the server level for the servers 310 and/or at a more granular level such as derived from the tokens. As represented by block 550, the method 500 further includes recording the access token to the rejected tokens (e.g., storing in the recently rejected tokens 330, FIG. 3) upon determining to reject the request.

Figure 6:
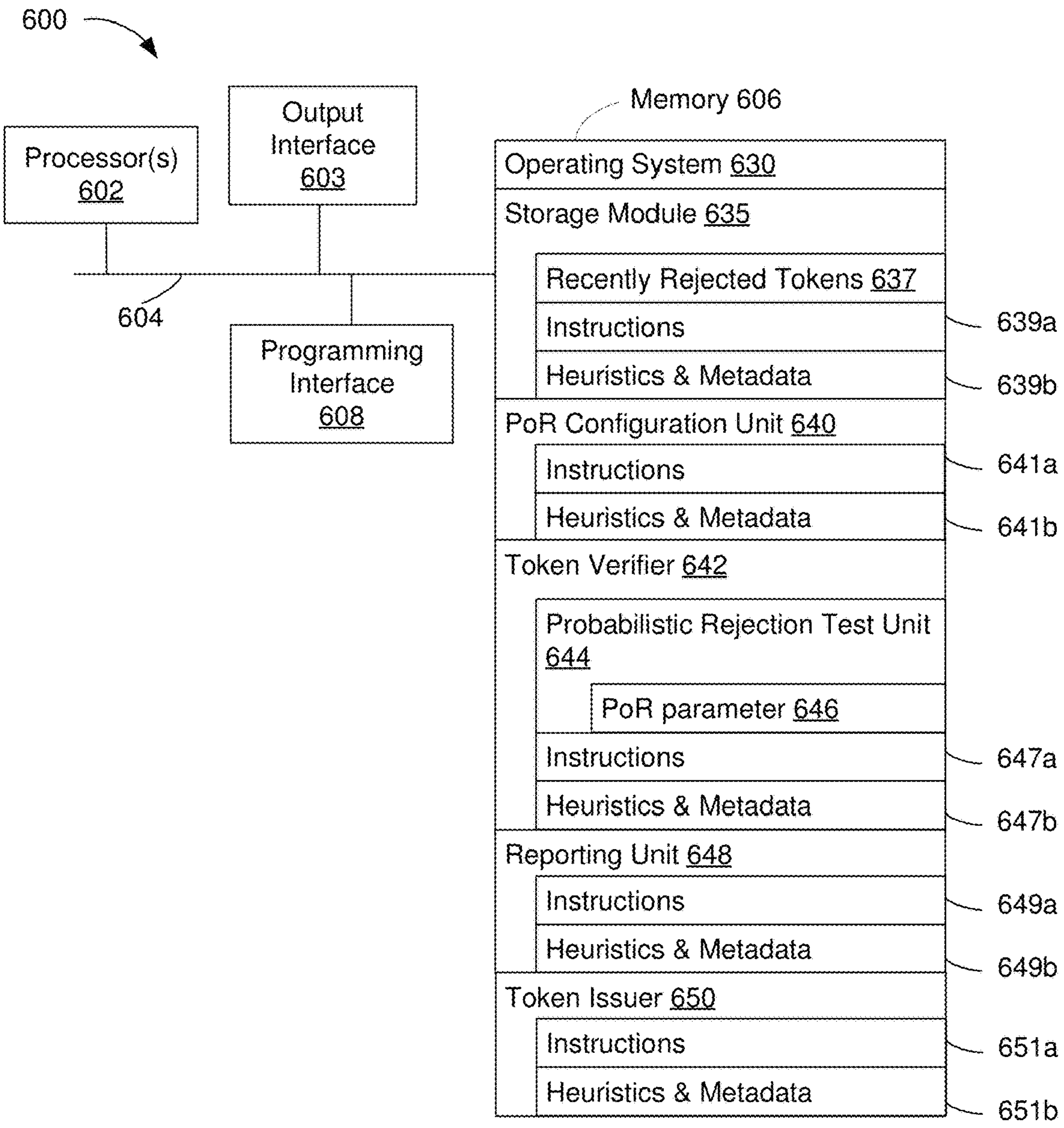
FIG. 6 is a block diagram of a computing device for randomized content access control, in accordance with some embodiments.

FIG. 6 is a block diagram of a computing device 600 for randomized content access control in accordance with some embodiments. In some embodiments, the computing device 600 corresponds to the one or more servers hosting the CDN 204 in FIGS. 2-4 and performs one or more of the piracy detection functionalities described above performed by the token verifier 210 and/or the leak identification system 220 with reference to FIGS. 2-5. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units 602 (e.g., CPU(s)/GPU(s)), one or more output interfaces 603 (e.g., a network interface for connecting with another computing device), a memory 606, a programming interface 608, and one or more communication buses 604 for interconnecting these and various other components.

In some embodiments, the communication buses 604 include circuitry that interconnects and controls communications between system components. The memory 606 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some embodiments, the memory 606 or the non-transitory computer readable storage medium of the memory 606 stores the following programs, modules and data structures, or a subset thereof including an optional operating system 630, a storage module 635, a PoR configuration unit 640, a token verifier 642, a reporting unit 648, and a token issuer 650. In some embodiments, one or more instructions are included in a combination of logic and non-transitory memory. The operating system 630 includes procedures for handling various basic system services and for performing hardware dependent tasks.

In some embodiments, the storage module 635 is configured to store and/or manage recently rejected tokens 637 (e.g., the recently rejected tokens 330 in FIG. 3). To that end, the storage module 635 includes a set of instructions 639*a* and heuristics and metadata 639*b*.

In some embodiments, the PoR configuration unit 640 is configured to configure the PoR values to be used in the probabilistic rejection tests. As described above with reference to FIG. 3, the PoR configuration unit 640 can set the PoR value at the server level, e.g., for the one or more servers 310. Alternatively, in some embodiments, the PoR value can be derived from tokens. To that end, the PoR configuration unit 640 includes a set of instructions 641*a* and heuristics and metadata 641*b*.

In some embodiments, the token verifier 642 validates tokens received along with content requests, e.g., checking access conditions for the requested content specified in the token are met, etc. In some embodiments, the token verifier 642 includes a probabilistic rejection test unit 644 (e.g., the probabilistic rejection test unit 320, FIG. 3) that further checks valid tokens and randomly rejects valid tokens. In some embodiments, the probabilistic rejection test unit 644 obtains a PoR parameter 646, e.g., a random number in the range of [0, 1] as a randomized probability, and compares the randomized probability with the PoR value from the PoR configuration unit 640 and/or the PoR value derived from the tokens. In addition to comparing the PoR values with the PoR parameter 646, in some embodiments, the probabilistic rejection test unit 644 also compares a token with the recently rejected tokens 637 during the rejection test. In some embodiments, the probabilistic rejection test unit 642 causes actions upon rejection, such as recording the rejected token to the recently rejected tokens 637 in the storage module 635, triggering token renewals, marking the client using the token as a potential leak, and/or adjusting the PoR values. To that end, the token verifier 642 includes a set of instructions 647*a* and heuristics and metadata 647*b*.

In some embodiments, the reporting unit 648 is configured to facilitate leak identification by the leak identification system 220 (FIGS. 2 and 3). In some embodiments, the reporting unit 648 tracks the frequency of token rejections and/or renewals and takes actions, e.g., marking the client as a potential leak, and coordinates with the PoR configuration unit 640 and/or the control plane to adjust the PoR values. In some embodiments, the reporting of the statistics, including the token rejections and request rejections, to a remote source such as the control plane 203 (FIGS. 2-4) causes the remote source to aggregate such reports of rejected tokens and/or reports and adjust the PoR values accordingly. To that end, the reporting unit 648 includes a set of instructions 649*a* and heuristics and metadata 649*b*.

In some embodiments, the token issuer 650 generates new tokens in response to a token renewal request. In some embodiments, rejecting tokens and/or requests by the token verifier 642 causes tokens to be renewed, e.g., the rejection triggering the client to contact the control plane to refresh the token as shown in FIG. 4, triggering the token issuer 650 at the CDN to refresh the token, and/or triggering a notification to the control plane to push a new token to the client. To that end, the token issuer 650 includes a set of instructions 651*a* and heuristics and metadata 651*b*.

Although the storage module 635, the PoR configuration unit 640, the token verifier 642, the reporting unit 648, and the token issuer 650 are illustrated as residing on a single computing device 600, it should be understood that in other embodiments, any combination of the PoR configuration unit 640, the token verifier 642, the reporting unit 648, and the token issuer 650 can reside in separate computing devices in various embodiments. For example, in some embodiments, each of the PoR configuration unit 640, the token verifier 642, the reporting unit 648, and the token issuer 650 resides on a separate computing device.

Moreover, FIG. 6 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:

at one or more servers including one or more processors and non-transitory memory, wherein the one or more servers include at least one content delivery network (CDN) server for streaming content to client devices and at least one control plane server for controlling tokens, and wherein the at least one CDN server stores rejected tokens in the non-transitory memory:

receiving a request for content from a client device, wherein the request is sent from the client device to the at least one CDN server and includes an access token granted by the at least one control plane server to a client associated with the client device upon authenticating the client;

determining, by the at least one CDN server, whether the access token is valid;

obtaining, by the at least one CDN server, a probability of rejection configured for the one or more servers and a randomized probability upon determining that the access token is valid;

determining, by the at least one CDN server, whether to reject the request by determining whether the access token exists among the rejected tokens and comparing the probability of rejection and the randomized probability; and rejecting the request and recording, by the at least one CDN server, the access token to the rejected tokens upon determining to reject the request.

2. The method of claim 1, wherein the probability of rejection is configured for the one or more servers by a content provider based at least in part on resources provided by the content provider and distributed by the one or more servers.

3. The method of claim 1, wherein the probability of rejection is configured for the one or more servers based on at least in part on statistics provided by the one or more servers.

4. The method of claim 1, wherein obtaining the probability of rejection includes:

extracting properties from the access token; and setting the probability of rejection based at least in part on the properties.

5. The method of claim 4, wherein:

the properties from the access token include a first geographic position; and setting the probability of rejection includes:

extracting a second geographic location from the request; and setting the probability of rejection based on the first geographic location and the second geographic location.

6. The method of claim 4, wherein the properties include the probability of rejection configured for the client upon granting the access token to the client.

7. The method of claim 4, wherein:

the properties include an issuance timestamp of the access token; and setting the probability of rejection includes reducing the probability of rejection in accordance with a timestamp of the request within a threshold from the issuance timestamp of the access token.

8. The method of claim 4, wherein:

the properties include an issuance timestamp of the access token and an expiration timestamp of the access token; and setting the probability of rejection includes adjusting the probability of rejection in accordance with a timestamp of the request between the issuance timestamp of the access token and the expiration timestamp of the access token.

9. The method of claim 1, wherein the randomized probability is drawn from a uniform distribution between 0 and 1.

10. The method of claim 1, wherein determining, by the at least one CDN server, whether to reject the request by determining whether the access token exists among the rejected tokens and comparing the probability of rejection and the randomized probability includes:

comparing the probability of rejection and the randomized probability to determine whether the randomized probability is less than the probability of rejection.

11. The method of claim 10, wherein determining to reject the request includes:

rejecting the request upon determining the randomized probability is less than the probability of rejection.

12. The method of claim 1, wherein determining to reject the request includes:

rejecting the request upon determining the access token exists in the rejected tokens.

13. The method of claim 1, further comprising:

storing in the non-transitory memory the rejected tokens for a predetermined duration.

14. The method of claim 1, further comprising:

causing the client device to obtain an updated access token upon rejecting the request.

15. The method of claim 1, wherein rejecting the request causes a frequency of the client requesting an updated access token to be evaluated, and the client is marked in accordance with the frequency deviates from an expected frequency.

16. The method of claim 1, further comprising:

causing a remote source to aggregate reports of requests being rejected; and causing the remote source to adjust the probability of rejection based on the aggregated reports.

17. A non-transitory memory storing one or more programs, which, when executed by one or more servers with one or more processors, wherein the one or more servers include at least one content delivery network (CDN) server for streaming content to client devices and at least one control plane server for controlling tokens, and wherein the at least one CDN server stores rejected tokens in the non-transitory memory, cause the one or more servers to:

receive a request for content from a client device, wherein the request is sent from the client device to the at least one CDN server and includes an access token granted by the at least one control plane server to a client associated with the client device upon authenticating the client;

determine, by the at least one CDN server, whether the access token is valid;

obtain, by the at least one CDN server, a probability of rejection configured for the one or more servers and a randomized probability upon determining that the access token is valid;

determine, by the at least one CDN server, whether to reject the request by determining whether the access token exists among the rejected tokens and comparing the probability of rejection and the randomized probability; and reject the request and record, by the at least one CDN server, the access token to the rejected tokens upon determining to reject the request.

18. The non-transitory memory of claim 17, wherein the randomized probability is drawn from a uniform distribution between 0 and 1.

19. A server comprising:

one or more processors;

a non-transitory memory;

a network interface connectable to client devices and at least one control plane server, wherein the server includes a content delivery network (CDN) server for streaming content to client devices, and wherein the CDN server stores rejected tokens in the non-transitory memory; and one or more programs, stored in the non-transitory memory, which, when executed by the one or more processors, cause the server to:

receive a request for content from a client device, wherein the request is sent from the client device to the at CDN server and includes an access token granted by the at least one control plane server to a client associated with the client device upon authenticating the client;

determine, by the CDN server, whether the access token is valid;

obtain, by the CDN server, a probability of rejection configured for the one or more servers and a randomized probability upon determining that the access token is valid;

determine, by the CDN server, whether to reject the request by determining whether the access token exists among the rejected tokens and comparing the probability of rejection and the randomized probability; and reject the request and record, by the CDN server, the access token to the rejected tokens upon determining to reject the request.

* * * * *